(12) United States Patent
Bardon et al.

(10) Patent No.: US 9,109,931 B2
(45) Date of Patent: Aug. 18, 2015

(54) INDUCTIVE FLUID FLOW METER HAVING AN INDUCTIVE TARGET PROVIDED ON THE SHAFT

(75) Inventors: Ross James Bardon, Luton (GB); Ronald Desmond Claridge, Luton (GB); Alam Rashid, Baldock (GB); Ivor Thomas Rogers, Hitchin (GB); William David Stockill, Baldock (GB); Douglas Richard Wright, Swanson (NZ)

(73) Assignee: Elster Metering Limited, Luton (GB)

( * ) Notice: Subject to any disclaimer, the term of this patent is extended or adjusted under 35 U.S.C. 154(b) by 775 days.

(21) Appl. No.: 13/265,811

(22) PCT Filed: Apr. 23, 2010

(86) PCT No.: PCT/GB2010/050663
§ 371 (c)(1),
(2), (4) Date: Dec. 29, 2011

(87) PCT Pub. No.: WO2010/122348
PCT Pub. Date: Oct. 28, 2010

(65) Prior Publication Data
US 2012/0160034 A1   Jun. 28, 2012

(30) Foreign Application Priority Data
Apr. 23, 2009  (GB) .................. 0907012.9

(51) Int. Cl.
G01F 1/05 (2006.01)
G01F 1/28 (2006.01)
G01F 15/00 (2006.01)
G01F 1/115 (2006.01)
G01F 1/12 (2006.01)

(52) U.S. Cl.
CPC . *G01F 1/115* (2013.01); *G01F 1/12* (2013.01)

(58) Field of Classification Search
None
See application file for complete search history.

(56) References Cited

U.S. PATENT DOCUMENTS

| | | | | |
|---|---|---|---|---|
| 3,854,339 A | * | 12/1974 | Muller | 73/462 |
| 3,863,806 A | * | 2/1975 | Risser, Jr. | 222/23 |
| 3,866,469 A | * | 2/1975 | Wemyss | 73/861.87 |
| 3,934,467 A | * | 1/1976 | Nicolas | 73/152.34 |
| 4,030,357 A | * | 6/1977 | Wemyss | 73/202 |
| 4,100,803 A | | 7/1978 | Gass | |
| 4,308,755 A | * | 1/1982 | Millar et al. | 73/861.77 |
| 4,333,354 A | | 6/1982 | Feller | |
| 4,379,411 A | * | 4/1983 | Laviano et al. | 73/861.78 |

(Continued)

FOREIGN PATENT DOCUMENTS

| | | |
|---|---|---|
| DE | 2713254 A1 | 9/1978 |
| DE | 2904048 A1 | 8/1979 |

(Continued)

OTHER PUBLICATIONS

Singapore Written Opinion for Application No. 201107795-5 dated Sep. 2, 2013.

(Continued)

*Primary Examiner* — Harshad R Patel
(74) *Attorney, Agent, or Firm* — Harness, Dickey & Pierce, P.L.C.

(57) ABSTRACT

A fluid flow meter, including a fluid flow path and rotor. The rotor has at least one blade positioned in the fluid flow path. A ring is positioned upstream from, and adjacent to the rotor. The ring is adapted to condition the flow at the leading edge of the rotor blade over a range of operating conditions.

22 Claims, 12 Drawing Sheets

(56) References Cited

U.S. PATENT DOCUMENTS

| | | |
|---|---|---|
| 4,404,861 A | 9/1983 | Wass |
| 4,545,021 A | 10/1985 | Suzuki et al. |
| 4,608,871 A | 9/1986 | Schleimann-Jensen |
| 4,754,642 A | 7/1988 | Miyairi et al. |
| 5,307,686 A * | 5/1994 | Noren .................. 73/861.87 |
| 5,372,048 A | 12/1994 | Dunbar |
| 5,373,234 A * | 12/1994 | Kulczyk .................. 324/174 |
| 5,728,950 A * | 3/1998 | Boulanger .............. 73/861.79 |
| 6,149,801 A | 11/2000 | Giordano et al. |
| 6,199,434 B1 | 3/2001 | Cornil et al. |
| 6,397,686 B1 * | 6/2002 | Taivalkoski et al. ....... 73/861.78 |
| 7,508,318 B2 * | 3/2009 | Casella et al. .......... 340/870.02 |
| 8,690,117 B2 * | 4/2014 | Dunn et al. ............ 251/129.01 |
| 2005/0039546 A1 * | 2/2005 | Payne et al. ............. 73/861.79 |
| 2007/0277606 A1 | 12/2007 | Robbins |
| 2009/0320608 A1 * | 12/2009 | Marcu et al. ............ 73/861.79 |
| 2010/0122990 A1 * | 5/2010 | Carapelli .................. 222/71 |
| 2010/0230437 A1 * | 9/2010 | Carapelli .................. 222/71 |
| 2012/0090406 A1 * | 4/2012 | Etter et al. ............. 73/861.79 |

FOREIGN PATENT DOCUMENTS

| | | |
|---|---|---|
| EP | 0099966 A1 | 2/1984 |
| EP | 0573802 A2 | 12/1993 |
| GB | 976236 A | 11/1964 |
| GB | 984941 A | 3/1965 |
| GB | 996507 A | 6/1965 |
| GB | 1309516 A | 3/1973 |
| GB | 1474800 A | 5/1977 |
| GB | 2234824 A | 2/1991 |
| JP | 55152421 A | 11/1980 |
| WO | 9316355 A1 | 8/1993 |
| WO | 2005/019778 A2 | 3/2005 |

OTHER PUBLICATIONS

New Zealand Further Examination Report for Application No. 596606 dated May 2, 2014.
New Zealand Further Examination Report for Application No. 596606 dated Nov. 5, 2012.
Mexican Office Action for Application No. MX/a/2011/011187 dated Nov. 22, 2012.
Japanese Decision of Rejection (English translation) for Application No. 2012-506582 dated Nov. 21, 2014.
Japanese Decision of Rejection (English translation) for Application No. 2012-506582 dated Oct. 17, 2013.
Great Britain Search Report of claims 39-49 for Application No. GB1006809.6 dated Jun. 2, 2011.
Great Britain Search Report of claims 31-38 for Application No. GB1006809.6 dated Jun. 2, 2011.
Great Britain Search Report for Application No. GB1006809.6 dated Sep. 3, 2010.
Chinese Office Action for Application No. 2010800279166 dated Aug. 5, 2014, and its English translation thereof.
Chinese Office Action for Application No. 2010800279166 dated Nov. 19, 2013, and its English translation thereof.
Chinese Office Action for Application No. 2010800279166 dated Dec. 27, 2012, and its English translation thereof.
Australian Patent Examination Report 1 for Application No. 2010240646 dated May 5, 2014.
Australian Patent Examination Report 2 for Application No. 2010240646 dated Feb. 16, 2015.

* cited by examiner

INDUCTIVE FLUID FLOW METER HAVING AN INDUCTIVE TARGET PROVIDED ON THE SHAFT

CROSS-REFERENCE TO RELATED APPLICATIONS

This application is a National Stage of International Application No. PCT/GB2010/050663, filed Apr. 23, 2010, and published in English as WO 2010/122348 on Oct. 28, 2010. This application claims the benefit and priority of Great Britain Application No. 0907012.9, filed Apr. 23, 2009. The entire disclosures of the above applications are incorporated herein by reference.

This invention relates to fluid flow meters, such as axial flow mechanical fluid flow meters. By "mechanical" we mean a flow meter which has a moving part, the movement of which is utilised as a measure of the flow. The moving part may be a rotor, the rotation of which is proportional to the fluid flow rate through the meter. The invention has particular relevance to precision measuring devices utilising inductive sensing of the rotor movement. The invention also relates to the characteristics of the rotor, such as the buoyancy characteristics.

Flow Conditioning Ring

According to one aspect of the present invention, there is provided a fluid flow meter, comprising: means for defining a fluid flow path; a rotor, with at least one blade, positioned in said fluid flow path; and a ring positioned upstream from, and adjacent to, said rotor; wherein the ring is adapted to condition the fluid flow at the leading edge of the rotor blade over a range of operating conditions. By providing a ring the accuracy and flow measuring range may be improved as compared to the accuracy and flow measuring range of an equivalent meter without a ring.

Preferably, said range of operating conditions is a range of flow rate. Preferably, said range of flow rate is less than the rated range of flow rate of the fluid flow meter, but preferably, more than 25% or 33% or 50% or 75% of said rated range.

Preferably, the flow conditions at the leading edge of the rotor blade are improved as compared to not having a ring.

Preferably, under said range of operating conditions, the flow conditions are improved in comparison with not providing a ring upstream of the rotor blade.

Preferably, under said range of operating conditions, the ring is adapted to smooth flow, for example by breaking down larger scale vortices (e.g. in comparison to smaller scale vorticity related to turbulent flow) shed upstream of the ring.

Preferably, under at least part of said range of operating conditions, the ring is adapted to induce substantially turbulent flow at the leading edge of the rotor blade.

Preferably, the radius of the ring is optimised in order to maximise the improvement in flow conditions at the leading edge of the rotor blade.

Preferably, the radius of the ring is greater than the radius of the rotor hub. More preferably, the radius of said ring is greater than the radius of the rotor hub by between 40% and 60% of the distance from the hub of the rotor to the tip of the blades, preferably between 45% and 55%, more preferably 53%.

Preferably, the radius of the ring is greater than the radius of the rotor hub by between 35% and 55% of the distance from the hub of the rotor to the means defining the flow path, preferably between 40% and 50%, more preferably 45%.

Preferably, the means defining the flow path is substantially cylindrical in shape. More preferably, the radius of the ring is between 65% and 85% of the radius of the cylindrical means defining the flow path, preferably between 70% and 80%, more preferably 75%.

Preferably, the ring is positioned centrally within said fluid flow path.

Preferably, the axial distance of the ring from the rotor hub is optimised to maximise the improvement in flow conditions at the leading edge of the rotor blade.

Preferably, the axial distance of the ring from the rotor hub is between 10% and 30% of the chord length of the ring, more preferably between 15% and 25%, yet more preferably 20%.

Preferably, the axial distance of said ring from said rotor hub is between 1.0 mm and 3.0 mm, more preferably between 1.5 mm and 2.5 mm, yet more preferably 2.0 mm.

Preferably, the leading edge of the ring is thinner than the trailing edge of the ring.

Preferably, the leading edge of the ring is tapered. More preferably, the leading edge of the ring is sharp.

Preferably the trailing edge of the ring is blunt. More preferably, the trailing edge of the ring is square.

Preferably, the shape of the ring is mouldable.

Preferably, the ring is further adapted to throttle the fluid flow at the rotor blade.

Preferably, the ring is further adapted to induce turbulent flow downstream of the rotor. More preferably, turbulent flow is induced at the exit of the flow meter. By inducing turbulent flow the pressure and head losses across the flow meter may be reduced.

Preferably, the ring is further adapted to at least partially relieve the thrust loading on said rotor.

According to a further aspect of the present invention, there is provided a method of substantially optimising the accuracy and flow range of a fluid flow meter, comprising: positioning a ring upstream from, and adjacent to, a rotor within a fluid flow path; and adjusting the characteristics and position of said ring to substantially optimise the accuracy and flow range.

Preferably, the characteristics comprise at least one of: the ring radius, the ring thickness, the ring chord length; and the ring's cross-sectional shape.

Preferably, the position comprises at least the axial distance from the rotor.

Sensor Assembly

According to a further aspect of the present invention, there is provided a fluid flow meter, comprising: means for defining a fluid flow path; a rotor positioned in said fluid flow path; an inductive target on the shaft of said rotor; and at least one inductive sensor; wherein said at least one sensor is positioned adjacent said inductive target. By utilising inductive sensors the resistance to rotation of the rotor is reduced, and therefore the life of the flow meter is increased as it uses less power than a conventional meter.

Preferably, the flow meter comprises at least 2, preferably 3 inductive sensors. More preferably, said sensors are positioned equiangularly from each other about said shaft.

Preferably, the rotor is arranged so that the target does not cause any imbalance, and either that can be achieved by having a plurality of targets equiangularly and/or equidistantly disposed, or it is achieved by counter-weighting the target.

Preferably, the targets are positioned on the shaft end-face.

Buoyancy Balanced Rotor (Including Method of Manufacturing Same)

According to a yet further aspect of the present invention, there is provided a rotor for a fluid flow meter that is neutrally buoyant and/or balanced about the axis of the rotor shaft.

Preferably, the rotor is buoyancy balanced. As used herein, balanced buoyancy preferably connotes a state whereby when an object is placed in a fluid it remains static in any orientation. By providing a buoyancy balanced rotor the accuracy of the flow meter at low rates can be improved. In a particularly preferred embodiment the rotor is balanced such that it remains in any orientation when placed in the fluid. The rotor may have balanced buoyancy in all 6 degrees of freedom associated with said rotor.

Preferably, the rotor is statically balanced. Preferably, the rotor is dynamically balanced (preferably when in the fluid).

The invention extends to a fluid flow meter incorporating the rotor as aforesaid.

According to a still further aspect of the present invention there is provided a method for manufacturing a balanced buoyancy rotor for a fluid flow meter, comprising: rotating the rotor, preferably in the fluid; determining the correct position to either add mass or to remove mass; and either adding or removing said mass accordingly.

Preferably, the rotor is dynamically balanced.

The invention extends to a fluid flow meter incorporating a rotor manufactured as aforesaid.

Inductive Target Wheel with Multiple Inductive Targets

According to a yet further aspect of the present invention there is provided a sensor assembly for a fluid flow meter, comprising: an inductive target wheel with a plurality of inductive targets, the rotation of which is adapted to provide a measure of fluid flow.

Preferably, the sensor assembly further comprises a plurality of inductive sensors, arranged such that the plurality of inductive targets induce a signal in the sensors.

Preferably, the number of inductive targets of the target wheel is not a multiple of the number of inductive sensors.

Preferably, the number of inductive targets on the target wheel is 4, 8, 12 or more.

Preferably, the number of inductive sensors is 3.

The invention extends to a fluid flow meter incorporating the sensor assembly as aforesaid.

Apparatus and method features may be interchanged as appropriate, and may be provided independently one of another. Any feature in one aspect of the invention may be applied to other aspects of the invention, in any appropriate combination. In particular, method aspects may be applied to apparatus aspects, and vice versa.

The invention will be described, merely by way of example, with reference to the accompanying drawings, wherein.

Figure 1:
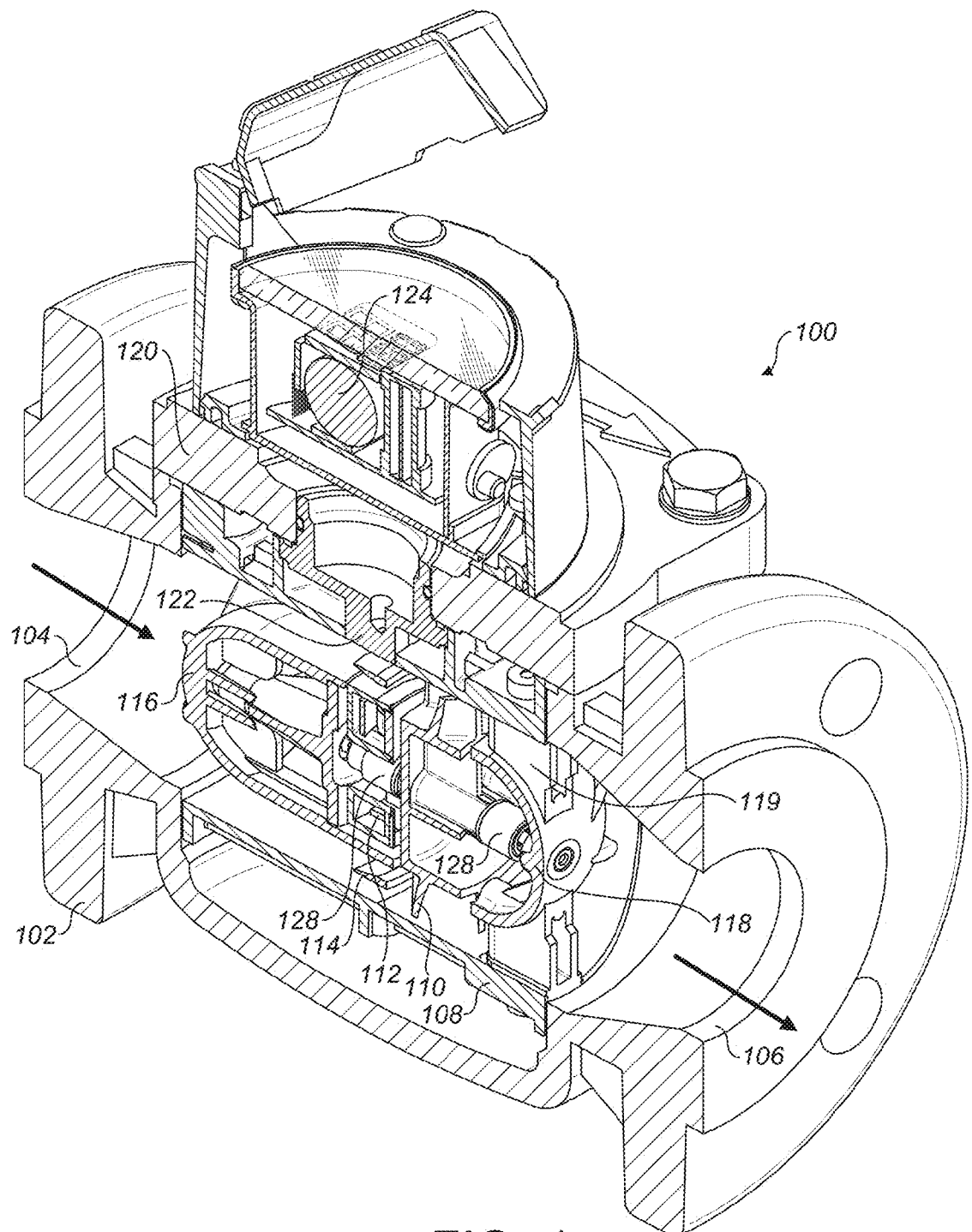
FIG. 1 is a section through a perspective view of a flow meter.

Referring to FIG. 1, the section through the flow meter shows the various features that comprise the flow meter 100. Reference numerals indicating like parts are used throughout.

The flow meter 100 comprises an outer casing 102 that has a flanged inlet connection 104 and a flanged outlet connection 106. Within the outer casing 102 is housed the meter measuring assembly insert 108. The meter measuring assembly insert 108 comprises a rotor 110, a sensor assembly 112, a flow conditioning ring 114, a first end piece (the nose) 116 and a second end piece (the tail) 118 for locating the rotor using bearings (for example, needle bearings), and various ribs 119 for maintaining the first and second end pieces within the measuring assembly 108. The first and second end pieces are held by the ribs such that the rotor axis and the flow meter axis are coincidental. The rotor comprises a shaft, a rotor hub and rotor blades. The rotor hub is substantially the same diameter as the end pieces.

The outer casing 102, made from cast iron or another similar material, is provided in a range of standard dimensions 40, 50, 65, 80, 100, 125, 150, 200, 250 and 300 mm (equivalent to the connecting pipe size). However, the insert 108 is only provided in three different sizes. In order for the insert to be useable over the entire range the inlet and outlet of the outer housing varies from being divergent/convergent sections (as shown in FIG. 1) to convergent/divergent sections. In some cases a proportion of the fluid flow may by-pass the measuring element.

The sensor assembly 112 comprises a horseshoe shaped body that positions three inductive sensors around the rotor shaft at approximately 120° intervals. The ASIC (application specific integrated circuit) used to condition the sensor signal prior to sending it to the register is positioned in close proximity to the sensors. The ASIC is positioned in close proximity so that the degradation in signal from the sensors is minimised, and hence the power requirement is reduced. The ASIC also contains the calibration data for the sensor assembly, and so the register can be changed at any point, e.g. if it becomes damaged.

Alternatively, the sensor assembly contains two sets of three inductive sensors, with each set offset from the other along the axis of the rotor. This effectively reduces the angular separation between the sensors from 120° to 60° and therefore increases the sensitivity of the overall sensor assembly. As a further alternative, each set of inductive sensors can comprise 1, 2 or more sensors.

The signal wires from the ASIC extend through the body of the sensor assembly, and out of the meter housing through the top of the sensor assembly 112; the signal wires are potted in the top of the sensor assembly to provide a seal. The top of the sensor assembly 112 protrudes through a pressure plate 120 and is sealed using a radial seal, such as an o-ring or the like. A flange, or diaphragm, is arranged around the top of the sensor assembly so that the pressure plate locates the sensor assembly in place, and so that the fluid pressure within the housing acts on the flange/diaphragm to maintain the seal between the pressure plate and the sensor assembly.

The rotor 110 has an inductive target comprising a metal foil strip positioned around 120° to 220° of the rotor shaft. In order to balance the rotor another metal foil strip 128 is positioned on the rotor shaft on the opposite side of the rotor and on the opposite side of the shaft. By using three inductive sensors and a strip positioned around 120° to 220° of the shaft, both the rotational speed and direction of the rotor can be determined. Using an inductive sensor increases operational flow range and the accuracy of the flow meter as compared to a mechanical or magnetic means for determining the rotational speed of the rotor. The operational flow range and accuracy are increased as the majority of the losses are due to back EMF, and these are very low relative to the losses in an equivalent meter using mechanical or magnetic means for determining the rotational speed of the rotor.

The metal foil strips are located on the shaft of the rotor, as opposed to the end face of the rotor body, because the distance between the sensor and the metal foil is critical for stable sensing and therefore accuracy. The rotor rotates on bearings (for example needle bearings) and so has end float; thus using a metal foil on the end face of the rotor would lead to a variable distance between the sensor and the metal foil.

In order to reduce any losses associated with hydrodynamic drag the metal foil strips are moulded into the rotor during manufacture. This is accomplished by first moulding the inner core of the rotor shaft, then placing the two metal foil strips in place, and finally over-moulding the core and strips with the polypropylene rotor, or another similar material.

Alternatively, a mechanical system, such as a worm-drive, can be utilised to measure the rotation of the rotor. In this case an inductive, magnetic or mechanical coupling is used to connect the output of the worm-drive to the register.

The measuring assembly and pressure plate are arranged to be a removable insert that is capable of being retro-fitted into existing infrastructure, e.g. to replace an existing mechanical measuring assembly.

A register 124 is provided above the pressure plate 120 to record the rotation of the rotor and hence the flow volume, and is protected from the environment by a cover or shroud.

The rotor is arranged to be neutrally buoyant, when in the measuring fluid such as water, and furthermore have balanced buoyancy in all 6 degrees of freedom. The rotor is arranged to have both static balance and preferably dynamic balance; static balance being when the rotor is not rotating, i.e. the rotor will remain in any position when placed in the measuring fluid, and dynamic balance being when the rotor is rotating, i.e. when rotating the forces exerted on the rotor bearings are constant at constant fluid flow. This enables the meter to operate over a very large range of flow rates (for example, from the equivalent of 1.5 rpm to 4000 rpm), with appropriate accuracy throughout the entire range. The geometry of the rotor core is designed to enable the neutral buoyancy, and the core is made from a different material to that of the rotor. The neutral buoyancy and balanced buoyancy is desirable at low flow rates to enable the rotor to rotate at a consistent speed, provided the rotor is dynamically balanced, and is desirable at high flow rates in order to reduce wear.

In order to compensate for any defects in the moulding process the rotor is balanced after manufacture. The process involves rotating the rotor, and determining the correct position to either add mass, e.g. small steel pins (heat staked into the rotor hub), or to remove material, e.g. where a void exists in order to maintain a substantially equal density.

Figure 2:
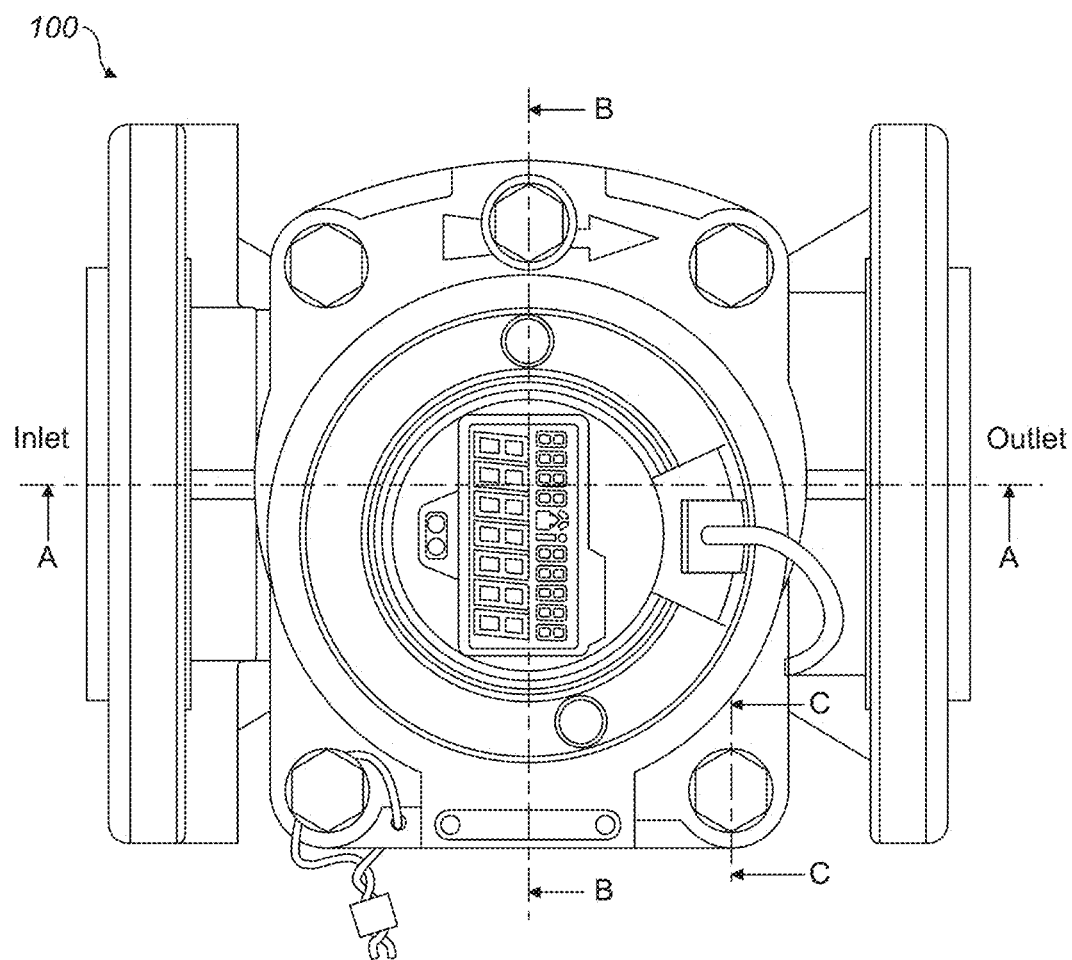
FIG. 2 is plan view of a flow meter, and indicates a number of cross sections detailed in FIGS. 3, 4 and 5.

FIG. 2 shows a plan view of the flow meter 100 and indicates three cross-sections A-A, B-B and C-C. Each indicated cross-section will be discussed in detail below with reference to the respective accompanying figures.

Figure 3:
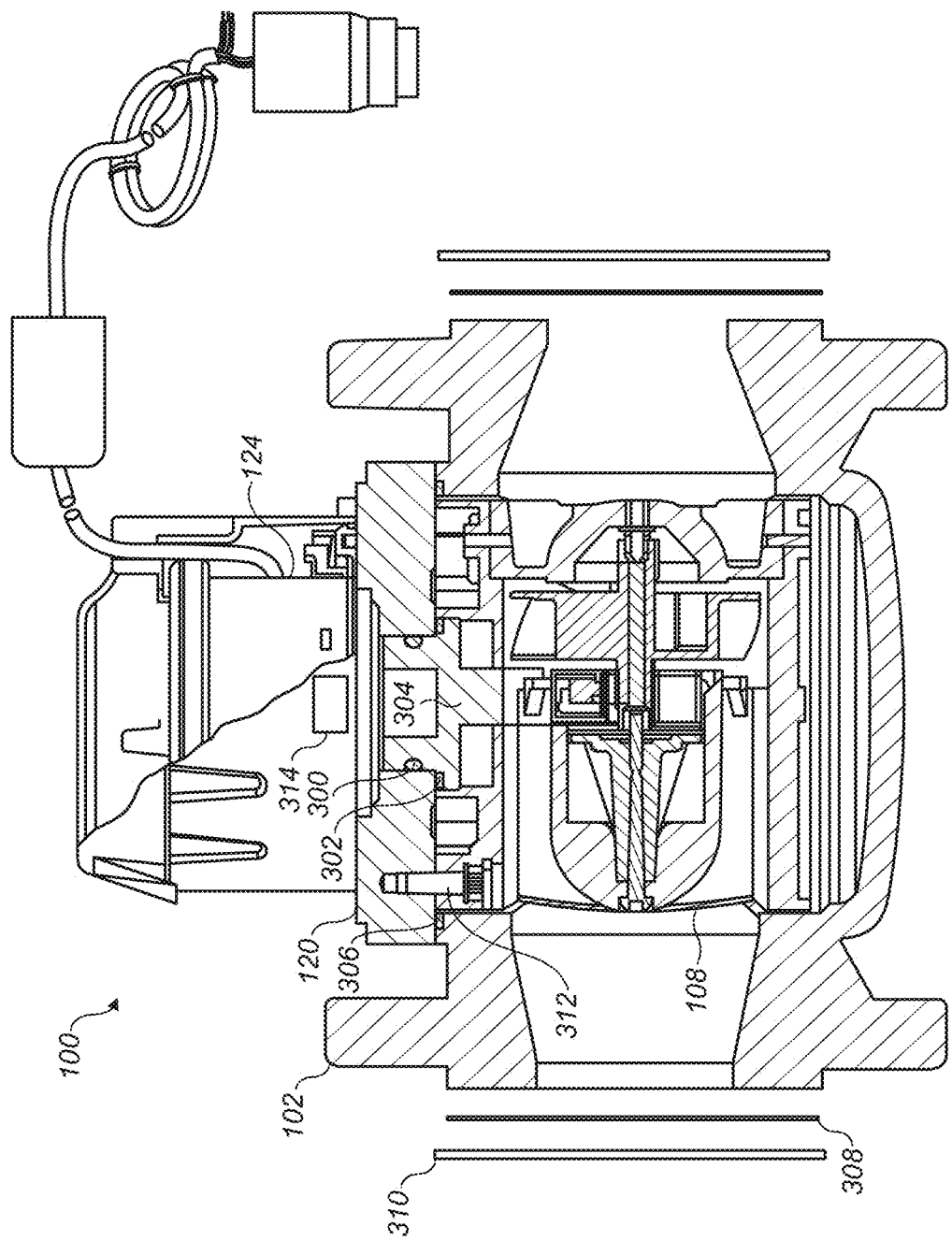
FIG. 3 is a section through a flow meter, at position A-A.

Referring to FIG. 3, showing section A-A (a similar cross-sectional view to that shown in FIG. 1), additional details can be seen. The radial seal 300, as described above, can be seen sealing the top of the sensor assembly with the pressure plate. In addition, an o-ring or the like 302 can be seen providing additional sealing between the flange/diaphragm 304 and the pressure plate. Furthermore, an o-ring or the like 306 is used to seal the pressure plate to the outer casing. Finally, the gaskets 308 and 310 are used to connect the outer casing to the external piping.

The pressure plate and measuring assembly are connected together, to form the insert, using bolt 312. This enables easy insertion of the unit into the outer casing.

The connector 314 is used to connect the sensor assembly to the register so that the output from the ASIC may be recorded.

Figure 4:
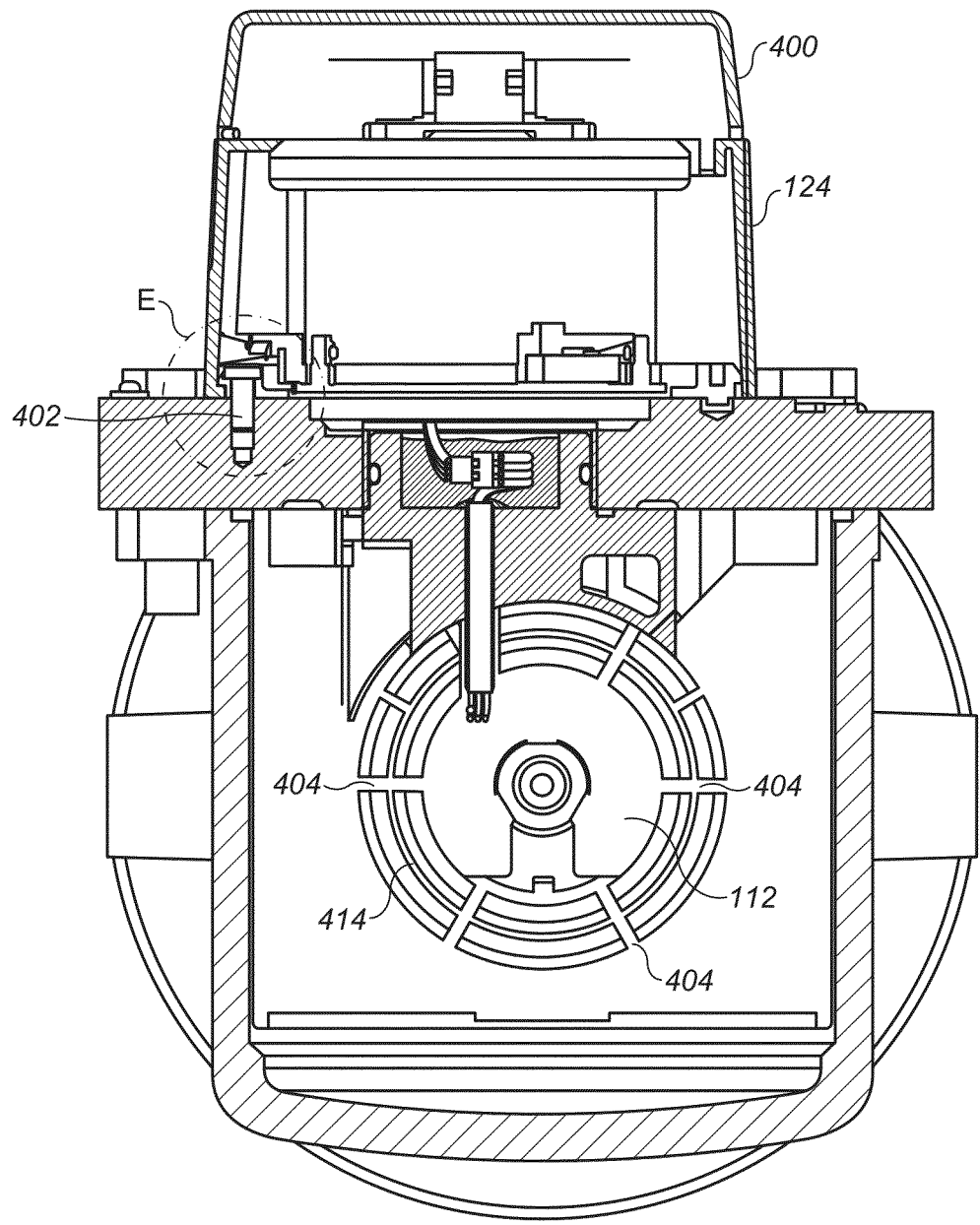
FIG. 4 is a section through a flow meter, at position B-B.
Figure 5:
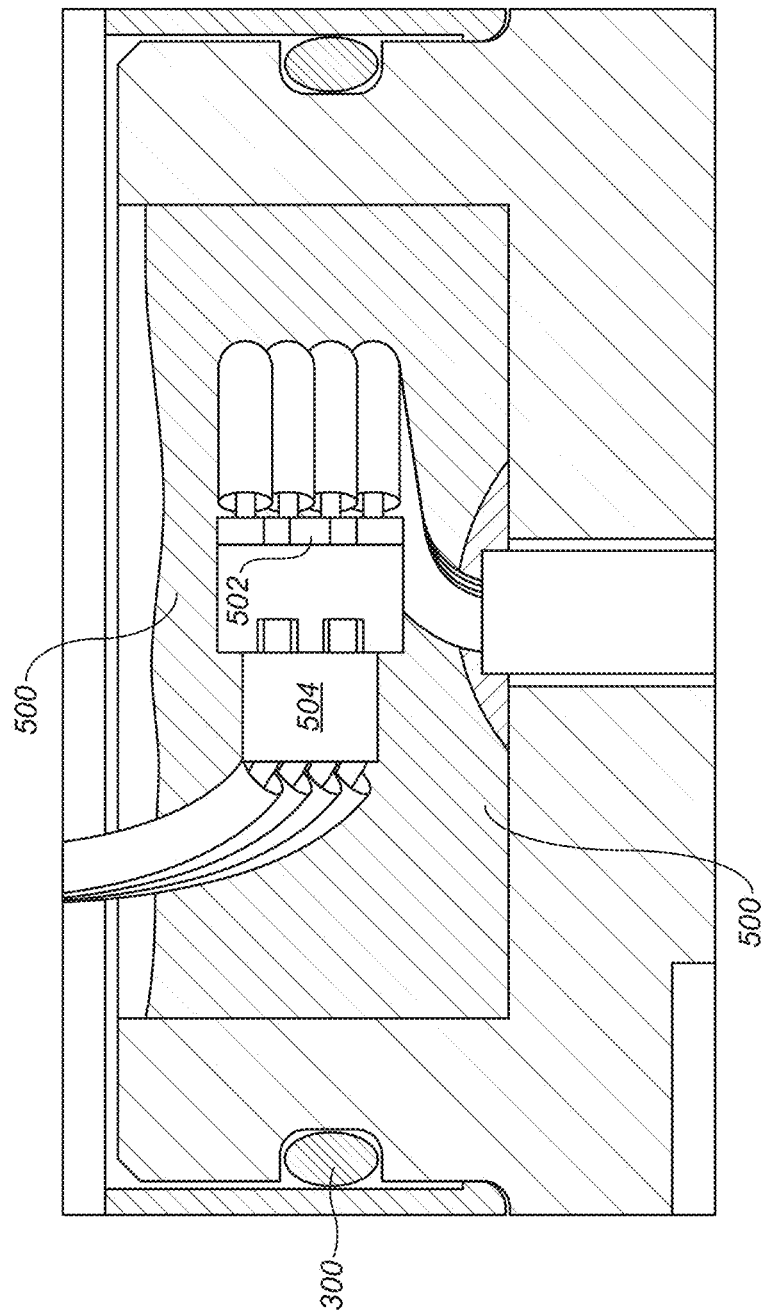
FIG. 5 is a section through a flow meter, at position C-C.
Figure 7:
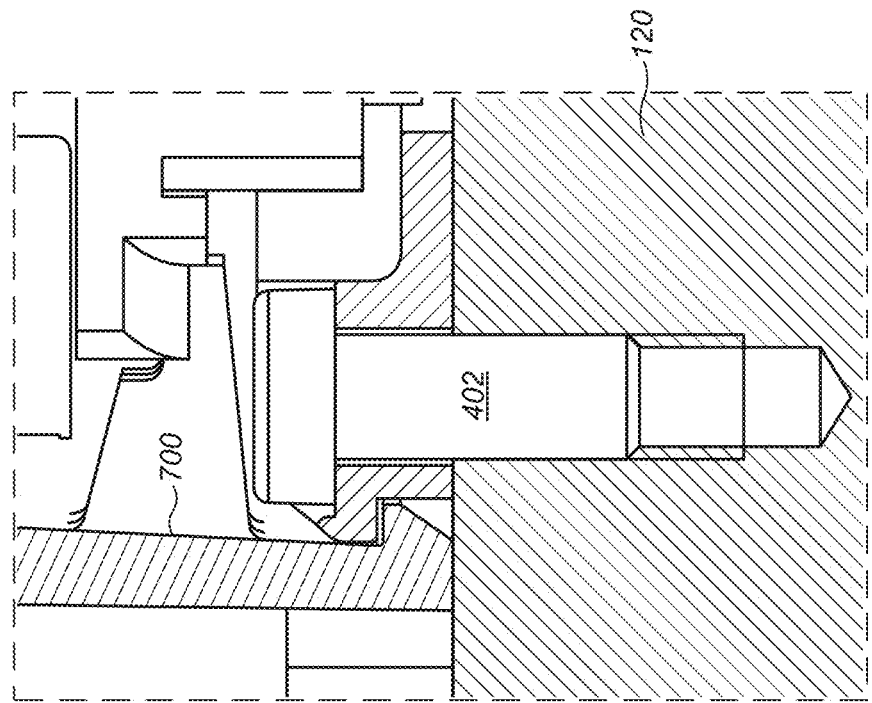
FIG. 7 is a detailed view of a part of the sensor assembly at point D as shown in FIG. 4.
Figure 6:
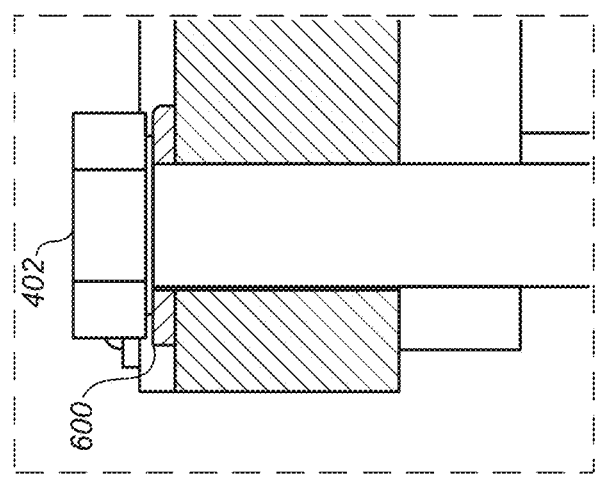
FIG. 6 is a detailed view of a register connection at point E as shown in FIG. 4.

Referring to FIG. 4, showing section B-B, the section view perpendicular to that shown in FIGS. 1 and 2 can be seen. In addition, two detailed views D and E are indicated, and these detailed views are shown in FIGS. 5, and 6 and 7 respectively. The register 124 is shown in addition to the shroud 400 covering the register display. In addition, the bolt 402 securing the register to the pressure plate is also shown.

As described above, the sensor assembly 112 is in the form of a horseshoe and is located around the rotor shaft. This enables the sensor assembly to be inserted around the rotor shaft easily during manufacture, and if needs be when the meter is in situ, i.e. if it is damaged. As the flow conditioning ring is preferably required to extend around the entire periphery of the flow path the sensor assembly housing contains a portion of the ring, and therefore completes the ring when it is inserted into the measuring assembly 108.

Alternatively, the sensor assembly is in the form of an annular ring located around the rotor shaft, and this alternative provides additional space to locate the various sensors. For example, this may be required in relatively small meters.

The flow conditioning ring 114, described above, can be seen in detail. The flow conditioning ring is located in place by various ribs 404. The hydrodynamic forces acting on the ring can be significant and so a substantial number of ribs are required. In addition to locating the ring, the ribs (or spokes) act to straighten the fluid flow. The ring acts to condition the fluid flow before the flow impinges on the rotor. In addition, the ring acts to reduce the thrust loading on the rotor during high flow rates by creating low pressure areas in front of the rotor.

The ring is chamfered from a thinner leading edge to a thicker trailing edge which aids in the reduction of thrust loading. The outside of the ring is parallel with the flow path.

The ring is positioned so that it is located just upstream of the rotor, and has a radius greater than the radius of the rotor hub. In order to condition the flow appropriately the ring is ideally located between 40% and 60% of the distance from the hub of the rotor to the tip of the blades (since the rotor blades are sized to just fit within the bore of the measuring element, the position of the flow ring can also be defined using the radius of the element bore, and will result in similar ratios), preferably between 45% and 55%, more preferably 53%.

Axially, the ring is located between 1.0 mm and 3.0 mm, preferably between 1.5 mm and 2.5 mm, more preferably 2.0 mm from the rotor blade. This provides the optimal flow conditioning while allowing any small debris to pass through the meter.

The chord length of the ring (with respect to the flow direction) is approximately 10 to 20 mm, perhaps 10 or 12 to 15 mm. A substantially narrower ring does not provide adequate flow conditioning, and is difficult to manufacture, while a substantially wider ring also does not adequately condition the flow.

In general, the ring is designed to optimise the flow conditions, and therefore maximise the performance improvement compared to a flow meter without a flow conditioning ring.

A vortex is shed from the divergent inlet section of the outer casing that reduces the accuracy of the meter if it is not suitably conditioned. The ring acts to break up the vortex and so provides a means for producing a substantially uniform flow over the rotor blades over a significant range of flow rates. By producing a substantially uniform flow over the rotor blades the flow conditions are improved such that the performance, in terms of accuracy and precision, is improved.

The range of operating conditions, specifically flow rates, where the ring acts to break-up/interrupt the vortex is less than the rated range of flow rate of the fluid flow meter, but more than 25% or 33% or 50% or 75% of the rated range.

Additionally, or alternatively, under at least some of the range of operating conditions (which range may or may not overlap with the range over which the vortex shedding is interrupted), the ring may trip the laminar fluid flow into turbulent fluid flow, thus providing a substantially uniform flow at the leading edge of the rotor blades.

Thus, the ring can be optimized to "flatten" the graph of the non-corrected sensor output vs flow rate. By "flattening" the graph the linearization process is easier, and so a more accurate meter is produced over a wider range of flow rates.

Referring to FIG. 5, showing detail D as indicated in FIG. 4, the radial seal 300 (an o-ring) can be seen. The potting compound 500 is used to seal the connector 502 from the sensor assembly ASIC and the connector 504 to the register within the top of the sensor assembly.

Referring to FIGS. 6 and 7, showing detail E as indicated in FIG. 4, the bolt 402 and washer 600 is used to connect the register to the pressure plate. The bayonet fitting 700 is also used in the connection of the register to the pressure plate.

Other forms of register may be used, for example ones providing telemetry or other remote reading instead of or in addition to a local display, or a mechanical rather than electronic display. Instantaneous flow rather than total flow (integrated) outputs also can be provided for process control applications.

Figure 8:
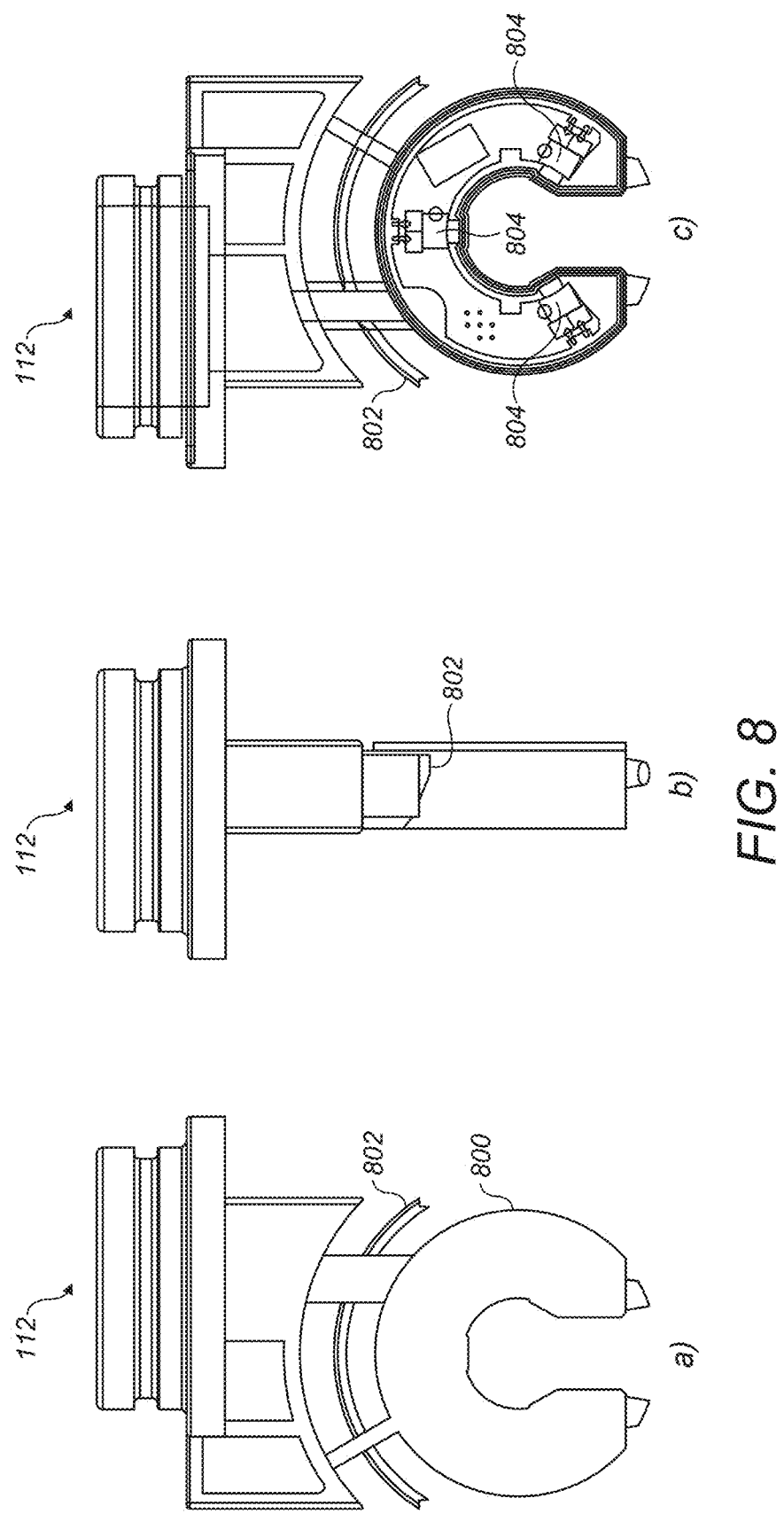
FIG. 8 are detailed views of the sensor assembly.

FIGS. 8 show an example of the sensor assembly 112. The horseshoe arrangement 800 and the part of the flow ring 802 attached to the sensor assembly are shown. The three inductive sensors 804 are shown positioned 120° about the horseshoe sensor assembly.

Figure 9:
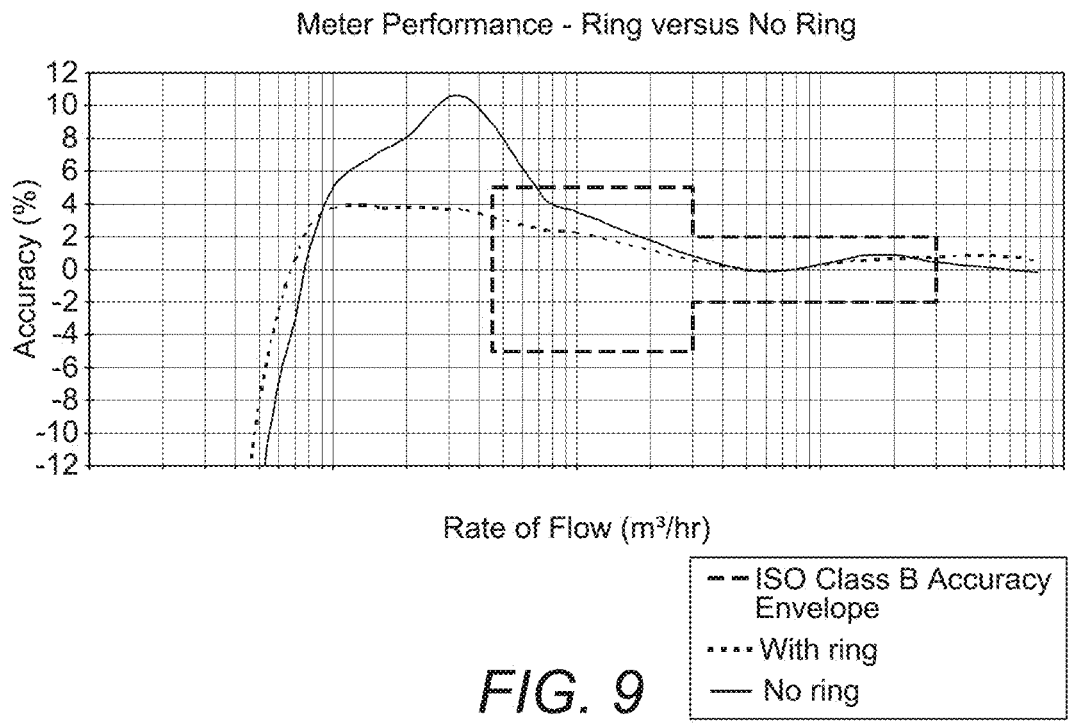
FIG. 9 is a graph showing the performance of a meter with and without a flow ring.
Figure 10:
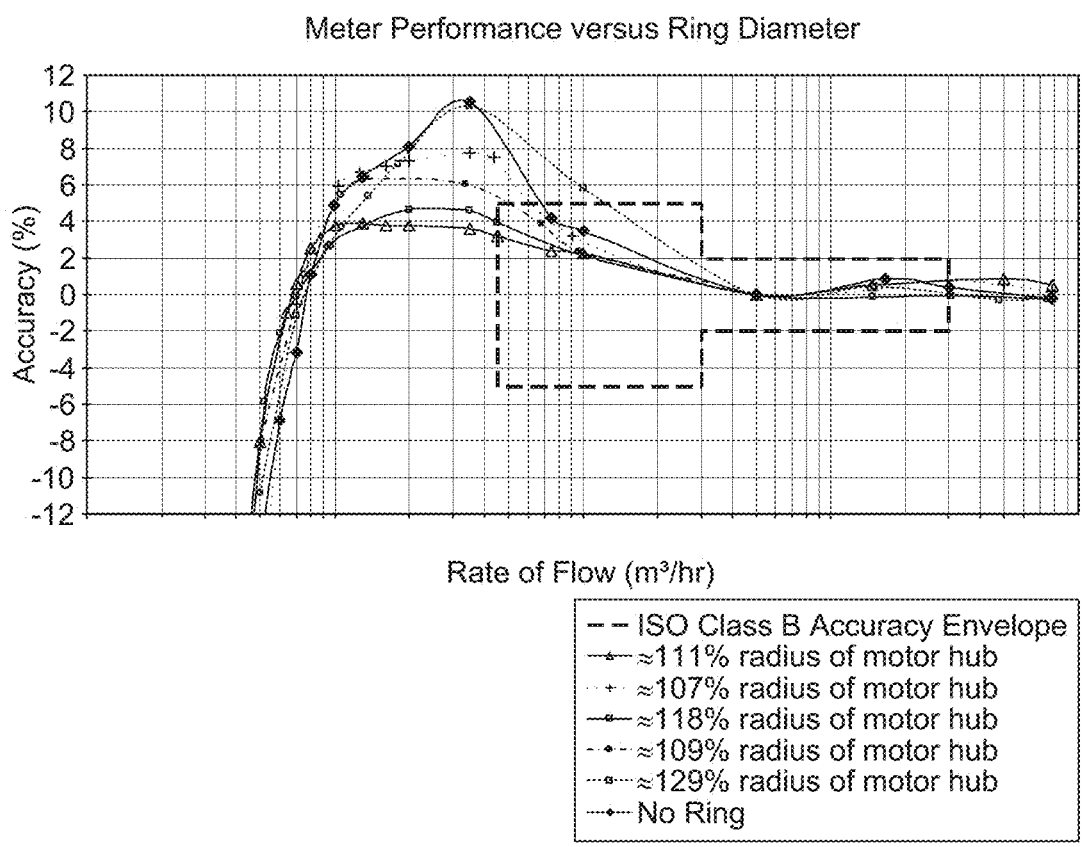
FIG. 10 is a graph showing the performance of a meter with varying flow ring diameter.

FIGS. 9 and 10 show the effect of including the flow ring within the flow path. As can be seen in FIG. 9, the accuracy of the meter is improved throughout the majority of the operating envelope (indicated by the dashed box). FIG. 10 shows the optimisation of the flow ring diameter for a specific 50 mm meter. As can be seen the better ring diameter for the 50 mm flow meter is approximately 111% of the rotor hub diameter.

Figure 11:
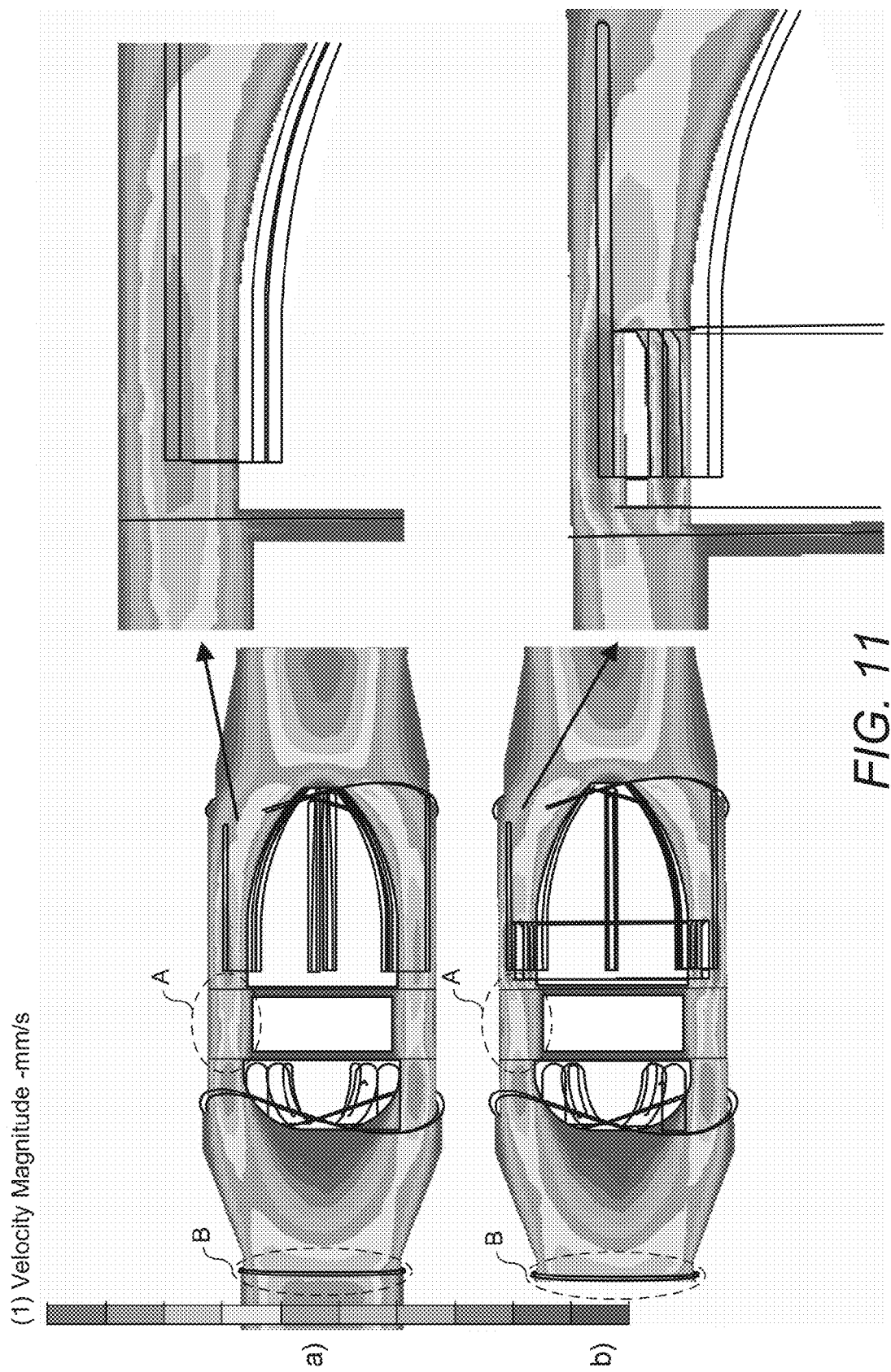
FIG. 11 is a CFD representation of the liquid flow through a flow meter.

FIGS. 11 show a CFD representation of the liquid flow through the flow meter with and without the flow ring. As can be seen in area A, the fluid flow has been throttled at the rotor by the ring, this is shown as a reduction in the flow velocity in this area. In addition, the velocity profile over the rotor blade is more uniform. As can be seen in area B, the velocity profile is substantially flattened, which is evidence of a turbulent flow; the turbulent flow induced in this area will reduce the total losses (pressure and head) across the flow meter.

Figure 12:
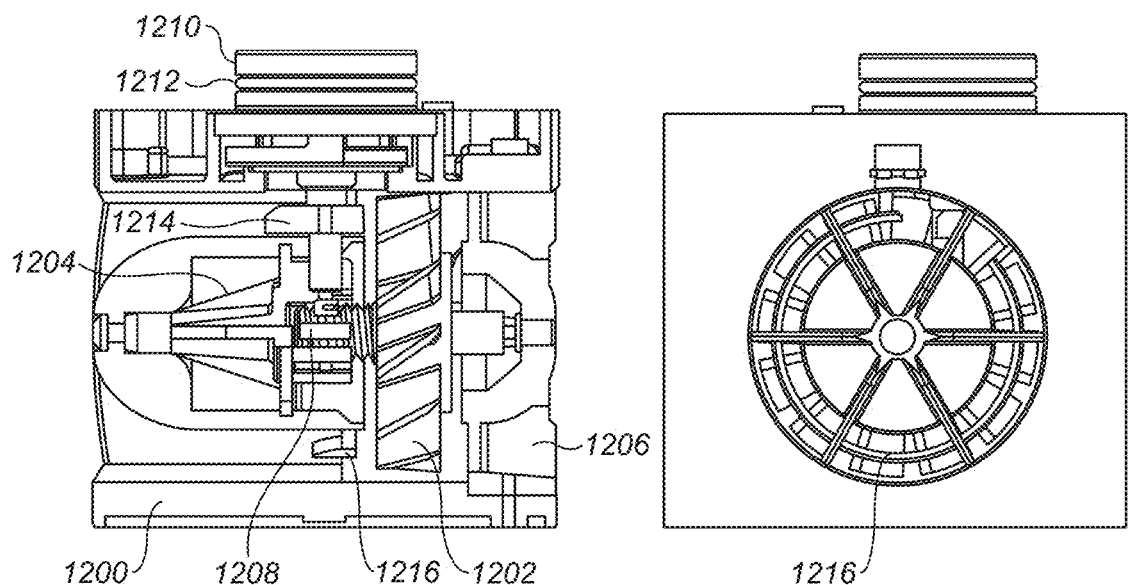
FIG. 12 is a section through a flow meter utilising a worm drive to output the rotation of the rotor.

FIG. 12 shows the flow meter using a worm drive to output the rotational speed of the rotor. The measuring element 1200 houses the rotor 1202 located by the upstream rotor support 1204 and the downstream rotor support 1206. The spindle assembly is adapted to output the rotor rotational speed using a worm drive to the dry-side of the meter via the diaphragm plug 1210, and is sealed by the o-ring 1212. A calibration vane is indicated by 1214. The flow ring 1216, as described above, is adapted to improve the accuracy of the flow meter.

Figure 13:
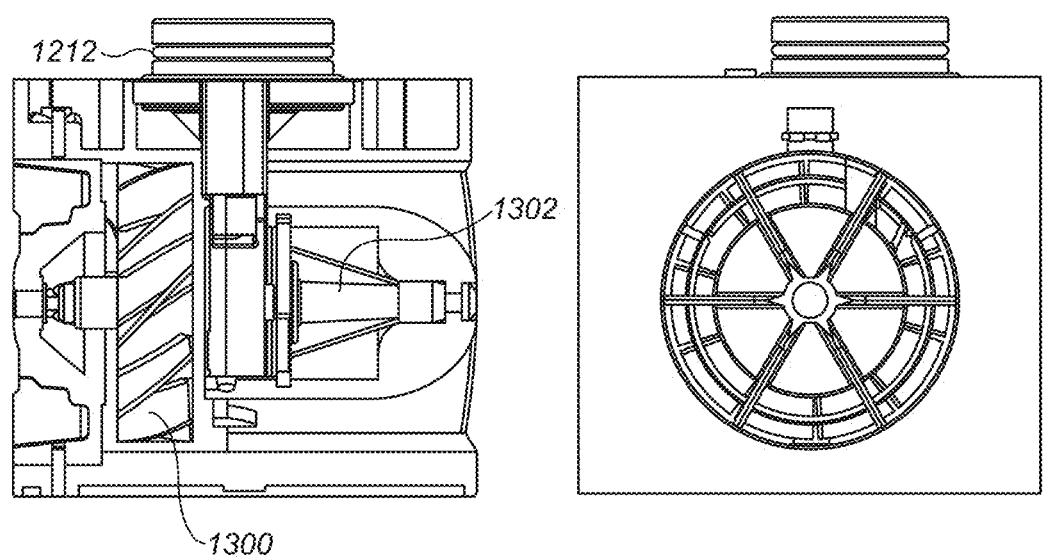
FIG. 13 is a section through a flow meter utilising inductive sensors to output the rotation of the rotor.

FIG. 13 shows an alternative view of the flow meter utilising inductive sensors to measure the rotational speed of the rotor 1300. The rotor 1300 is located by the upstream rotor support 1302.

Figure 14:
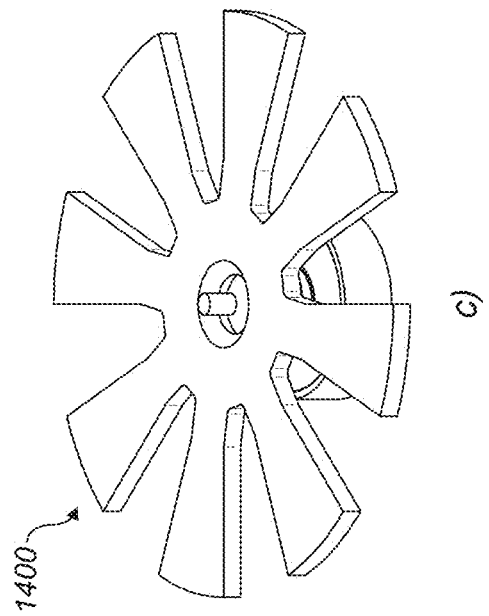
FIG. 14 are various rotor targets.
Figure 14:
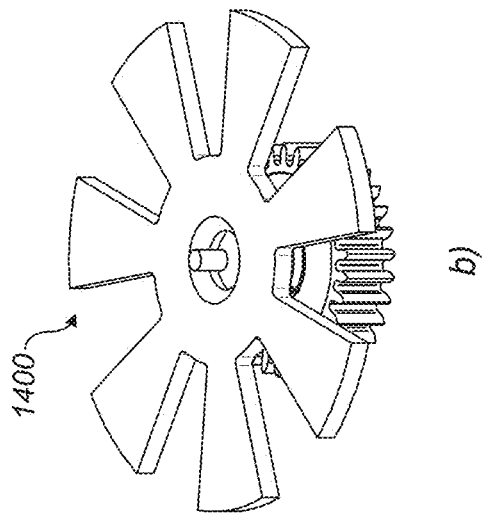
Figure 14:
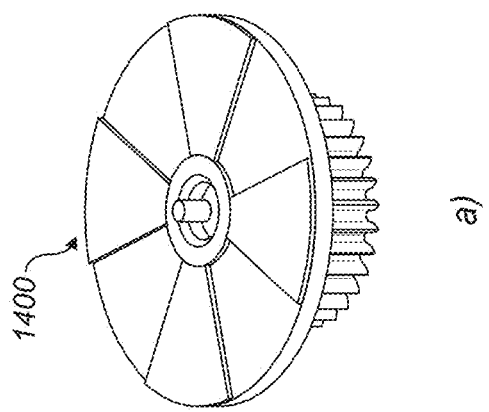
Figure 15:
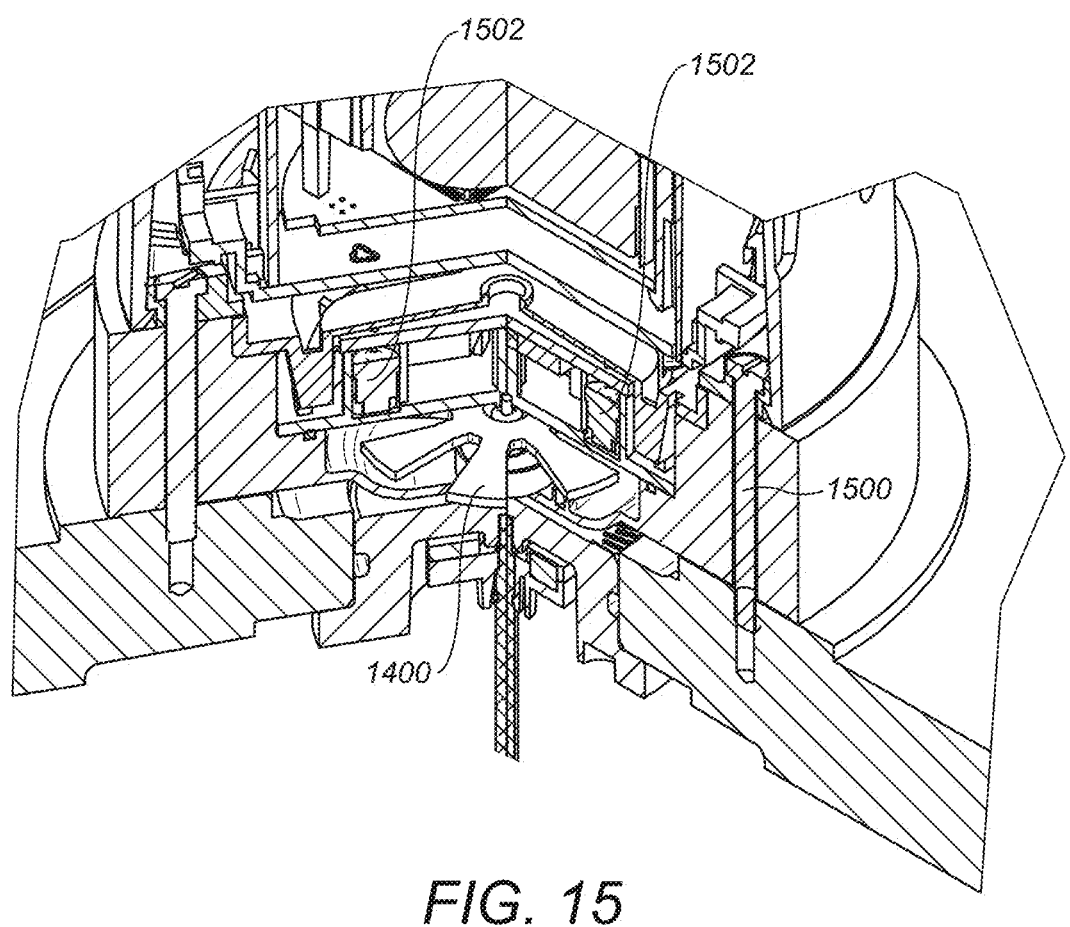
FIG. 15 shows a cut-away of a flow meter utilising inductive targets with multiple inductive targets.

FIGS. 14 show variations of inductive target wheels 1400 each with multiple inductive targets. The inductive targets, in conjunction with an inductive sensor assembly can be utilised to retro-fit a mechanical flow meter in order to enable an electronic output. An example of such a flow meter is shown in FIG. 15, where the conventional mechanical register unit has been replaced by an inductive register unit 1500. The target wheel 1400 has multiple inductive targets that are sensed by the inductive sensors 1502 of which there are three positioned 120° apart around the inductive target. Conventionally a single inductive target is utilised, but this limits the resolution of the output. By providing multiple inductive targets the resolution is increased in proportion to the number of targets used. However, the number of inductive targets used is limited by the diameter of the target wheel, as each inductive target must be large enough to provide a consistent signal in the inductive sensor. In addition, when using 3 inductive sensors the number of targets must not be a multiple of 3, since with this number of targets the direction of the target wheel could not be determined. Increasing the number of inductive targets also increases the low flow rate performance of the meter due to a reduction in gear-train drag by eliminating much of the gear-train.

The target wheel can be installed on a flow meter in situ, and thus any existing meter with a spindle output can be upgraded to an inductive output.

Each feature disclosed in this specification (which term includes the claims) and/or shown in the drawings may be incorporated in the invention independently of other disclosed and/or illustrated features. In particular but without limitation the features of any of the claims dependent from a particular independent claim may be introduced into that independent claim in any combination.

It is of course to be understood that the invention is not intended to be restricted to the details of the above embodiments which are described by way of example only, and modifications of detail can be made within the scope of the invention.

The invention claimed is:

1. A fluid flow meter, comprising:
    means for defining a fluid flow path;
    a rotor mounted on a rotor shaft and positioned in said fluid flow path including at least one target on said rotor shaft, wherein the target is inductive; and
    a sensor assembly positioned in said fluid flow path including at least one sensor, wherein the sensor is inductive; wherein said sensor assembly is located around said rotor shaft such that said at least one sensor is positioned adjacent said at least one target and wherein the shaft is balanced so that the at least one target does not create an imbalance in the rotor.

2. A fluid flow meter according to claim 1, further comprising at least two sensors.

3. A fluid flow meter according to claim 2, wherein said at least two sensors are positioned equiangularly from each other about said shaft.

4. A fluid flow meter according to claim 3, wherein said at least one target is disposed in an end-face of the shaft.

5. A fluid flow meter according to claim 1, comprising a plurality of said at least one target, wherein said plurality of at least one target are disposed equiangularly about the shaft.

6. A fluid flow meter according to claim 1, comprising a plurality of said at least one target, wherein said plurality of at least one target are disposed equidistantly about the shaft.

7. A fluid flow meter according to claim 6, further comprising counter weights adapted to counter balance the plurality of said at least one target.

8. A fluid flow meter according to claim 1, further comprising counter weights adapted to counter balance the at least one target.

9. A fluid flow meter according to claim 1, wherein said at least one target is disposed in an end-face of the shaft.

10. A fluid flow meter according to claim 1, wherein the rotor is neutrally buoyant and/or balanced about the axis of the rotor shaft.

11. A fluid flow meter according to claim 10 wherein the rotor is balanced such that it remains in any orientation when placed in the fluid.

12. A fluid flow meter according to claim 10, wherein the rotor is statically balanced.

13. A fluid flow meter according to claim 10, wherein the rotor is dynamically balanced, when in the fluid.

14. A fluid flow meter according to claim 10, wherein the rotor is buoyancy balanced.

15. A fluid flow meter according to claim 14 wherein the rotor is balanced such that it remains in any orientation when placed in the fluid.

16. A fluid flow meter according to claim 15, wherein the rotor is statically balanced.

17. A fluid flow meter according to claim 16, wherein the rotor is dynamically balanced, when in the fluid.

18. A fluid flow meter according to claim 1, wherein the number of at least one target is not a multiple of the number of the at least one sensor.

19. A fluid flow meter according to claim 18, wherein the number of the at least one target on a target wheel is 4, 8, 12 or more.

20. A fluid flow meter according to claim 19, wherein the number of the at least one sensor is three.

21. A fluid flow meter according to claim 1 in which the rotor has at least one blade, and comprising:
   a ring positioned upstream from, and adjacent to, said rotor, wherein the ring is adapted to condition the fluid flow at a leading edge of the at least one blade over a range of operating conditions.

22. A fluid flow meter according to claim 21, in which the rotor is neutrally buoyant and/or balanced about the axis of the rotor shaft.

* * * * *